April 15, 1952 C. L. STROUP 2,593,214
CIRCUIT CONTROL MEANS
Filed Nov. 9, 1946 2 SHEETS—SHEET 1
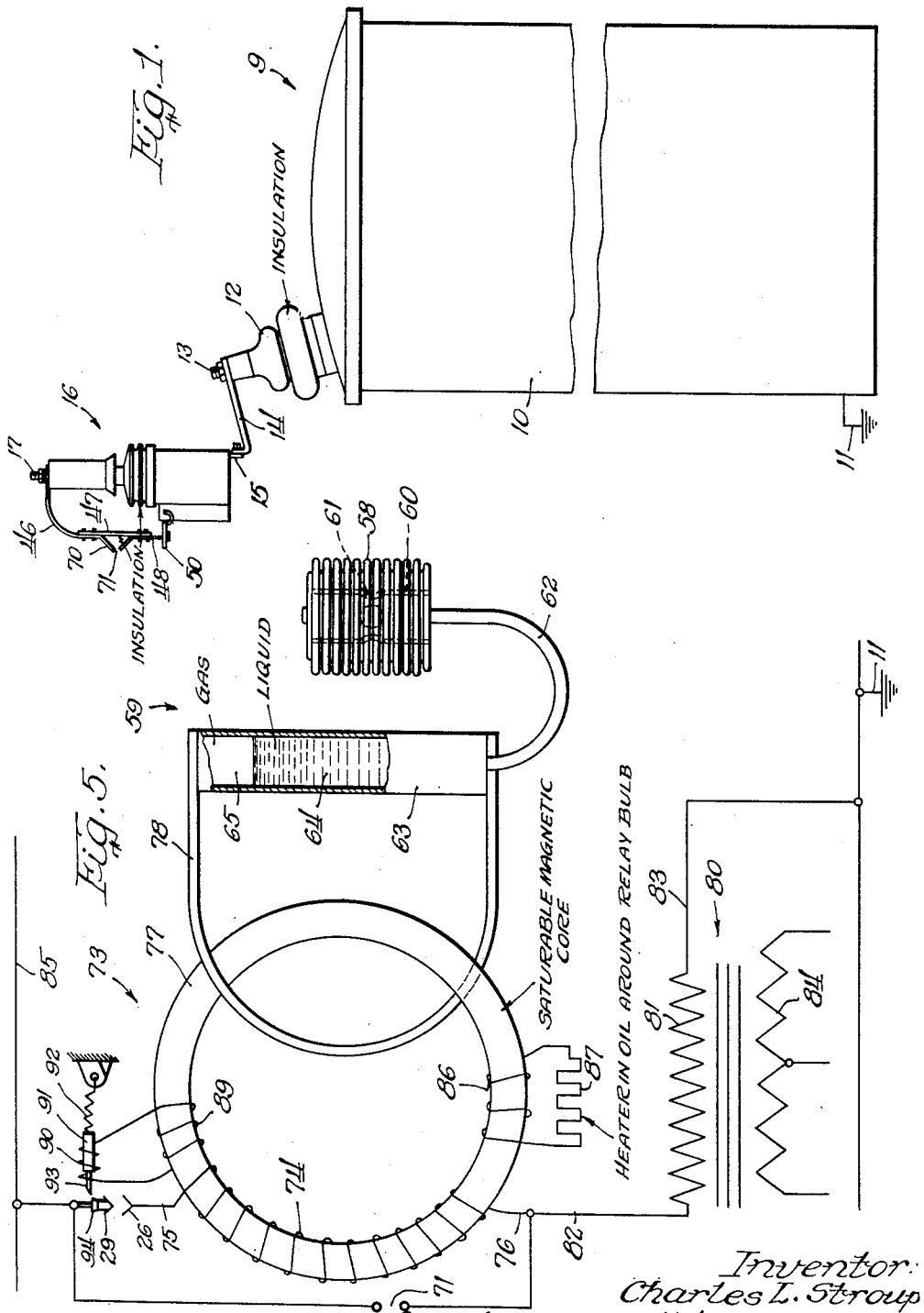
Inventor:
Charles L. Stroup
By Brown, Jackson, Boettcher & Dienner
Attys

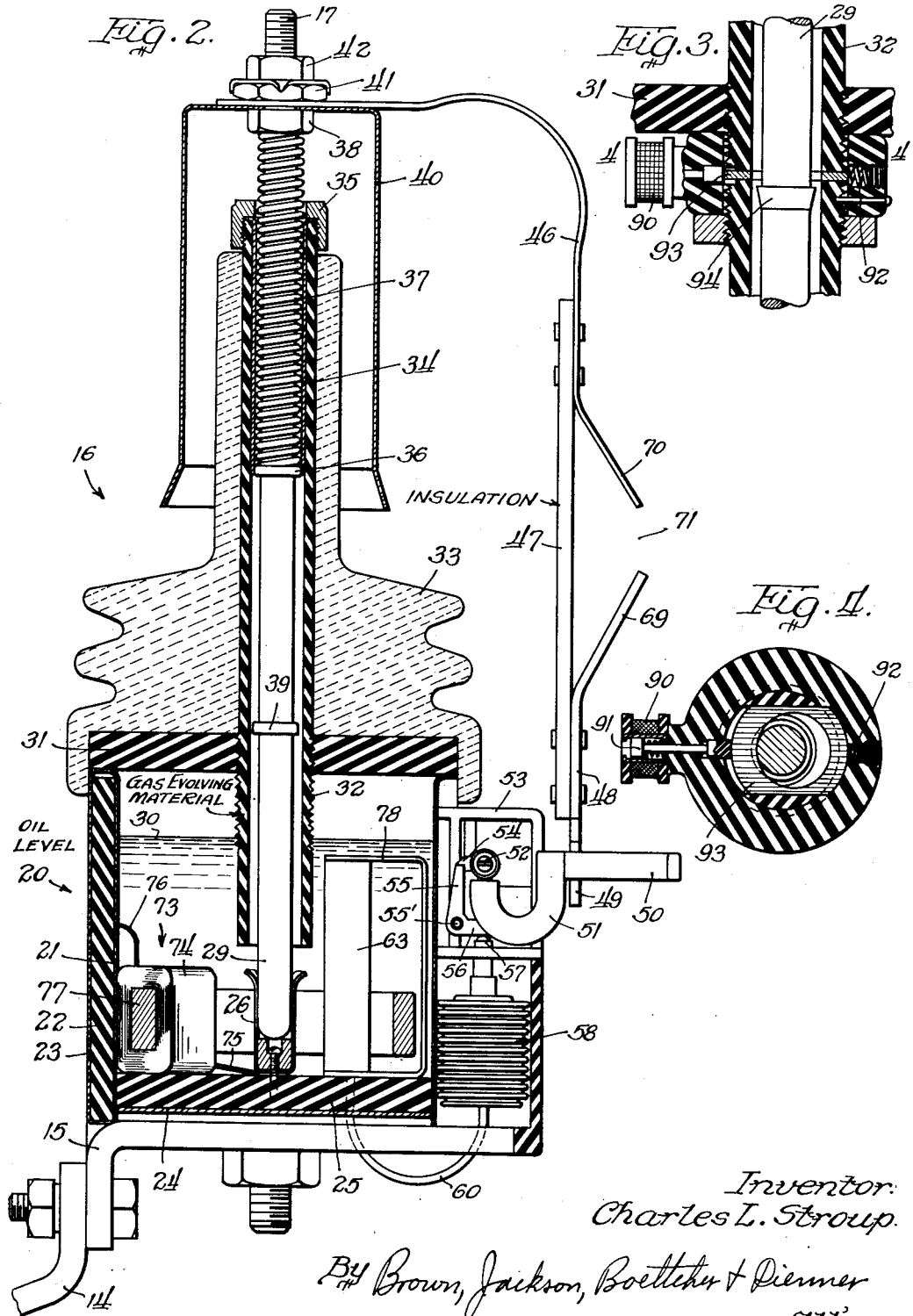

ed Apr. 15, 1952

2,593,214

UNITED STATES PATENT OFFICE 2,593,214

CIRCUIT CONTROL MEANS

Charles L. Stroup, Oak Park, Ill.

Application November 9, 1946, Serial No. 708,860

5 Claims. (Cl. 175—294)

My invention relates, generally, to circuit interrupting devices, and it has particular relation to circuit breakers for opening the circuit to the winding of a load device, such as the primary winding of a transformer. This invention constitutes an improvement over the inventions disclosed in my co-pending applications, Serial No. 568,279 filed December 15, 1944, and Serial No. 642,215 filed January 19, 1946, now Patents 2,457,939 and 2,543,712, respectively.

In alternating current distribution systems, it is cutomary to supply several distribution transformers through a single circuit breaker which constitutes a main circuit breaker with respect to the circuit breakers or interrupting devices which are individual to the transformers. Each transformer is connected individually to supply several customers. The primary winding of each transformer may be energized at a relatively high voltage, such as 2,300 to 4,000 volts or higher, while the secondary winding is energized at a relatively low voltage, such as 110 to 220 volts. When the main circuit breaker is opened for any reason, such as in response to a fault on the system, all of the transformers supplied thereby are deenergized. This results in cutting off the current flow to all of the customers supplied by the several transformers.

Obviously, the main circuit breaker should be opened only in case of emergency. It is customary to provide for reclosing the main circuit breaker a number of times after a fault occurs in an attempt to maintain the service in the event that the fault is of a momentary or transient character. Provision is made for locking out the main circuit breaker only after repeated attempts have been made to restore the service. Such repeat operations of the main circuit breaker may be automatic, in which case the circuit breaker goes through a predetermined time-cycle of reclosure operations. The operation of the circuit breaker may be manually effected as will be readily understood.

The fault often is of a temporary or transient character. A bird or a squirrel may temporarily short circuit the high voltage terminal of the distribution transformer to ground. This may be sufficient to cause sufficient current flow to effect operation of the main circuit breaker. It opens the circuit and, in the meantime, if the fault has been cleared by the bird or squirrel dropping away, the circuit breaker may be reclosed and service may be restored. It may take more than one reclosure to destroy the foreign object causing the flow of fault current so that repeated reclosures are required for accomplishing the same.

In the event that the fault should persist at a particular transformer after one or two reclosures of the main circuit breaker, it is desirable to disconnect this transformer so that service may be maintained on the other transformers. This limits the inconvenience to the customers served by a single transformer. Such a fault may be in the form of a cracked insulator bushing on the transformer, or a punctured transformer coil, or short circuited transformer coil turns. To take care of isolating the individual transformer on the occurrence of such a fault, a circuit interrupter individual thereto is provided.

It is desirable to open the circuit to each transformer after the same has operated under limited overload conditions for an appreciable length of time. When the load device, such as the transformer is cold, it can be overloaded safely for a short interval. For example, it is possible to operate a transformer at 100% overload for an hour or two without damaging it, provided that its temperature does not exceed predetermined allowable limits.

Small overload conditions may be simulated by the short circuiting of one or a few turns of the transformer windings. This will cause the transformer to overheat and may eventually result in the destruction of the transformer insulation. Such a slight overload is accompanied by a slight increase in the current flow through the high voltage or primary winding of the transformer.

From the standpoint of economics it is impractical to provide a circuit interrupter for each transformer which has the circuit interrupting capacity of the main circuit interrupter that is common to a number of transformer installations. Accordingly, the interrupting capacity of the circuit interrupting device for each transformer is substantially less than that of the main circuit interrupter. On occasion, the flow of fault current at a transformer may be of such a magnitude that it cannot be interrupted safely by the circuit interrupter individual thereto, but it can be interrupted by the main circuit breaker.

However, after the fault has been cleared by the main circuit breaker, it is desirable that the circuit interrupter individual to the transformer open the circuit thereto so that, when the main circuit breaker is reclosed, either automatically or manually, the fault will not remain on the system. Such operation is in the interest of providing maximum continuity of service to the customers which are not supplied by the particular transformer where the fault is present.

When the flow of current to the primary winding of the transformer is utilized to determine when the circuit interrupter individual thereto should be opened, various difficulties are encountered. The current flow to the transformer under slight overload conditions may be of the order of only a few amperes. The normal load current may be of the order of one ampere. While it is desirable to provide means which will be responsive to the flow of 1½ to 2 amperes for tripping the circuit interrupter individual to the transformer, provision must also be made for taking care of the flow of a wide range of fault currents which may be of the magnitude of several hundred or even thousands of amperes. The same current responsive device which will operate satisfactorily in response to the flow of a few amperes may be injured or totally destroyed if it is subjected to the flow of several hundred amperes.

Accordingly, among the objects of my invention are: To effect the operation of a circuit interrupter in response to the flow of small or large fault currents without damage to the current responsive means; to limit the current flow to the current responsive means to a predetermined maximum regardless of the magnitude of the flow of fault current; to energize directly a hydraulic relay as a result of the flow of current, which is a function of the fault current, through a portion of the hydraulic relay; to operate the hydraulic relay in accordance with the time-current characteristics of the load device so as to open the circuit interrupter only after the load device reaches a dangerous operating condition; to prevent the circuit interrupter from opening the circuit on the flow of fault current in excess of a predetermined magnitude and thereafter to trip the circuit interrupter on the cessation of such excess current flow; to permit manually tripping of the circuit interrupter without operating the automatic trip mechanism; and to provide a spark gap across the circuit interrupter, the terminals of which are formed by parts of the trip mechanism.

Other objects of my invention will, in part, appear hereinafter. My invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description, taken together with the accompanying drawings, in which:

Figure 1 is a view, in side elevation, of a conventional transformer of the single insulator bushing type on which is mounted a circuit interrupter constructed in accordance with my present invention;

Figure 2 is a longitudinal sectional view, at an enlarged scale, which shows certain of the details of construction of the circuit interrupting device that is illustrated in Figure 1;

Figure 3 is a detail sectional view which illustrates one form of automatic holding means that may be employed in practicing my invention;

Figure 4 is a detail sectional view taken along the line 4—4 of Figure 3; and

Figure 5 illustrates, diagrammatically, the circuit connections which may be employed in practicing my invention.

Referring now particularly to Figure 1 of the drawings, it will be observed that the reference character 9 designates, generally, the transformer which may be of the conventional oil insulated single phase type having a metal case 10 that is grounded at 11. The transformer 9 may be of the single insulator type and may have an insulator bushing 12 extending upwardly from the cover thereof, as illustrated. The insulator bushing 12 supports a high voltage terminal rod 13 from which a bar 14 of copper or the like extends.

The bar 14 is arranged to be engaged by the down turned end of a terminal bar 15 which constitutes one terminal of a circuit interrupter indicated, generally, at 16 that is constructed in accordance with the present invention. The other terminal of the circuit interrupter 16 is indicated at 17, and it is arranged to be connected to a high voltage conductor, as will be readily understood.

In Figure 2 of the drawings the details of construction of the circuit interrupter 16 are shown more clearly. It will be observed that it includes an oil pot, designated generally at 20, which is made up of an inner shell 21 of conducting material, such as copper, and which is surrounded by suitable heat insulating material 22. A sheath 23 of metal surrounds the covering 22 of insulating material. The shell 21 is sealed at its lower end by a metal bottom 24 which carries immediately thereabove a disc 25 of insulation. Mounted on the disc 25 is a generally U-shaped contact 26 which forms one of a pair of separable contacts that are arranged to be opened under certain conditions as will be described in detail hereinafter. The other contact 29 is in the form of a rod of suitable conducting material, such as copper or brass, and constitutes an extension of the terminal 17, previously referred to. The contact 29 is arranged to separate from contact 26 under oil, the level of which is indicated at 30. The oil may be any suitable well-known insulating liquid that is employed for circuit interrupting purposes. At its upper end the shell 21 is closed by a disc 31 of insulating material, into which is threaded a tube or sleeve 32 of insulating material, such as fiber, which, when subjected to the heat of the arc drawn between the contacts 26 and 29, evolves an arc extinguishing medium that assists in extinguishing the arc. Surrounding the tube 32 is an insulator 33 which is formed of porcelain or other similar weather resisting material.

A metal sleeve 34 depends from the upper end of the tube 32 and is clamped in position thereon by a clamp nut 35. At the lower end of the sleeve 34 is secured a thimble 36 against which a coil compression spring 37 reacts for biasing the contact 29 upwardly. The upper end of the spring 37 bears against the underside of a nut 38 that is threaded on the upper end of the contact 29. Unless restrained, as described hereinafter, the spring 37 would move the contact 29 upwardly to separate the same from stationary contact 26. The upward movement is limited by a stop ring 39, secured to the contact 29, when it engages the underside of the thimble 36.

Above the nut 38 there is provided a metal cap 40 which moves with the contact 29 and which extends downwardly over the upper end of the insulator 33. The cap 40 serves to protect the upper end of the insulator 33 and parts associated therewith from the weather. A clamp nut 41 serves to hold the cap 40 in place. Another nut 42 is provided for clamping the line conductor between it and the nut 41 so as to make the necessary electrical connection to the terminal 17 and to the contact 29 which forms a part thereof.

A strap 46 of flexible resilient conducting material is clamped between the nuts 38 and 41, as shown, and forms one part of a multi-part connector which is employed in the latch mechanism, which will be described presently. The strap 46 is secured, as by riveting, to one end of a bar 47 of insulation. At the other end of the bar 47 is a metal fitting 48 which has a foot portion 49 that is arranged to be inserted between the bifurcated ends 50 of a latch lever 51. In my copending application, Serial No. 642,215, I have shown in more detail a preferred construction for the bifurcated ends 50 of the latch lever 51. The latch lever 51 may be pivoted at 52 in a metallic housing 53 which is carried by the terminal bar 15. Integrally formed with the latch lever 51 is a nose portion 54 that is arranged to have latching engagement with one arm 55 of a bell-crank which may be pivoted at 55' on the housing 53. The other arm 56 of the bell-crank is arranged to be engaged by a plunger 57, which is operated on expansion of a flexible bellows 58 that is located at the lower end of the housing 53.

The bellows 58 forms a part of a hydraulic relay which is indicated, generally, at 59 in Figure 5 of the drawings. Within the bellows 58 there is provided a tubular compression member 60 which serves to limit the amount that the bellows 58 can contract. Since it is desired that the bellows 58 expand to perform the tripping function only when the relay 59 is subjected to a predetermined temperature, the compression member 60 is provided to preload the same and prevent unnecessary operation of the bellows 58 below this temperature. The compression member 60 has apertures 61 therein to permit circulation of fluid therethrough.

It will be observed that the bellows 58 is connected by a capillary tube 62 to a bulb 63 which may be in the form of a cylindrical gas-tight container. It is preferably formed of conducting material, such as copper. The liquid within the bulb 63, which substantially fills it and fills the tube 62 and bellows 58, is indicated at 64. A gas space is indicated at 65. It is the expansion of the gas in the space 65 which forces the liquid from the bulb 63 into the bellows 58 and causes the latter to expand.

It is desirable to provide for by-passing the operating mechanism within the circuit interrupter 16 in the event that a lightning surge occurs on the line to which the terminal 17 is connected. For this purpose the fitting 48 is provided with an integrally formed outwardly inclined extension 69, and likewise, the strap 46 is provided with a similarly positioned extension 70 to form a spark gap 71 therebetween. The dimensions of the spark gap 71 are such that a lightning surge or other transient high voltage wave will discharge thereacross.

Another function of the upward and outwardly extending portion 69 of the fitting 48 is to provide for receiving the prong of a switch stick. This permits the foot portion 49 to be swung manually downwardly into engagement with the bifurcated ends 50 of the latch lever 51. Because of the flexible resilient strap 46 this also permits the foot portion 48 to be unlatched from the latch lever 51 without operating the latch mechanism so as to permit movement of the contact 29 out of engagement with the contact 26. Thus, it is unnecessary to operate manually the bell-crank formed by the arms 55 and 56 for unlatching the foot portion 49 and releasing the contact 29 for movement to the open circuit position.

The construction of the latch mechanism is such that it is tripped or unlatched when the bulb 63 is heated to a predetermined temperature. For example, the design may be such that the flexible bellows 58 does not further expand until the bulb 63 is subjected to a temperature of, for example, 170° F.

While it is desirable to provide for heating the bulb 63 in accordance with the flow of current through the circuit interrupter 16, it is necessary, as indicated hereinbefore, to take care of a wide range currents, i. e., ranging from a few amperes to several hundred or even thousands of amperes, and still avoid injury to the current responsive mechanism. Accordingly, instead of directly heating the bulb 63 by the line current, as disclosed in my co-pending application, Serial No. 642,215, I have provided a control or current transformer, which is indicated, generally, at 73 having a primary winding 74 that is connected by terminal conductors 75 and 76 in series with the contacts 26 and 29. Specifically, the terminal conductor 75 is connected to the stationary contact 26 while the conductor 76 is connected to the shell 21 that, in turn, is connected to the terminal bar 15.

The transformer 73 also includes a saturable magnetic core 77 on which the primary winding 74 is wound. The core 77 has a single turn secondary winding 78 surrounding the same and connected across the bulb 63. The size of the magnetic core 77 is such that, regardless of the amount of current flow through the primary winding 74, the current flow through the single turn secondary winding 78 will not exceed a predetermined value. For example, the design may be such that the core 77 will saturate so that the current flow induced into the single turn secondary winding 78 will not exceed 500 amperes.

During normal operating conditions the current flow through the primary winding 74 does not induce sufficient current into the single turn secondary winding 78 to produce a heating effect sufficient to raise the temperature of the bulb 63 above the critical temperature. However, when the current flow through the primary winding 74 increases to fault current proportions, enough current is induced into the secondary winding 78 to produce sufficient resistance losses in the bulb 63 to heat the gas in the gas space 65 and cause the liquid 64 to be driven into the bellows 58. As a result, the bellows 58 expands, the bell crank lever comprising the arms 55 and 56 is rocked to the tripped position and latch lever 51 is released. The foot 49 then swings out of engagement with the bifurcated ends 50 of the latch lever 51 and, under the influence of the coil compression spring 37, the contact 29 is moved upwardly to interrupt the circuit.

As indicated hereinbefore, the contacts 26 and 29 are separated under oil. This serves to extinguish the arc which is incident to the operation of the circuit interrupter 16.

It will be observed that the bulb 63 is located in the oil which is used for assisting in circuit interruption. When the bulb 63 is in intimate contact with the oil, its temperature is correspondingly affected. Accordingly, it is possible to damp or retard the action of the hydraulic relay 59 in accordance with the amount of oil that is adjacent the bulb 63. This makes it possible to duplicate in the circuit interrupter 16, the time-current characteristics of the transformer 9. Initially, when the transformer 9 is cold, it can be overloaded to a limited extent for a limited period. The design of the circuit interrupter 16 may be such that, as the overload current flows therethrough to the transformer, the time-temperature changes therein will duplicate those in the transformer 9. But, after the transformer 9 has been subjected to a slight overload for a predetermined time, the bulb 63 will finally be heated to its critical temperature at the time after which it would be unsafe to continue the overload on the transformer. Thereupon the hydraulic relay 59 operates by expansion of the bellows 58 to trip the circuit interrupter 16, as described above.

When the construction disclosed herein is employed, it is possible to so design it that, when the normal full-load current of the transformer is of the order of 0.7 amperes, and the transformer is capable of withstanding a 100% overload for one hour, the hydraulic relay 59 will function at the end of this period in response to the flow of 1.4 amperes through the primary winding 74 to trip the circuit interrupter 16 and open the circuit.

While the circuit interrupter can be designed so as to be sensitive to this relatively small increase in current flow, the construction is such that it is also capable of withstanding the flow of relatively high fault current. The primary winding 74 can be constructed of the required number of turns of a relatively large cross-section conductor so as to be capable of carrying, for short periods of time, relatively great fault currents. However, because of the saturable magnetic core 77, the amount of current induced into the single turn secondary winding 78 is limited, as described hereinbefore. Under such operating conditions on the occurrence of a relatively severe fault, the bulb 63 is quickly heated to above its critical temperature and the hydraulic relay 59 immediately performs the tripping function. For example, under short circuit operating conditions, it can be designed so that it will trip within one second after the fault current starts to flow.

In Figure 5 of the drawings the circuit details of the invention are illustrated diagrammatically. It will be noted that the main transformer windings are indicated, generally, at 80 and that they include a primary winding 81 which may be connected by a conductor 82 in series circuit relation with the primary winding 74 of the control or current transformer 73. A conductor 83 may be provided for connecting the other terminal of the primary winding 81 to ground 11. The secondary or low voltage winding of the transformer 80 is indicated at 84. It will be understood that this winding is connected to energize the various circuits of the customers or to other loads supplied by the transformer 9. The high voltage line conductor is indicated at 85.

With a view to providing a wider range in the design characteristics of the circuit interrupter 16, a second secondary winding 86 may be wound on the core 77 of the control transformer 73 for energizing a heater 87 which is immersed in the oil or insulating liquid surrounding the bulb 63.

Because of the use of the saturable magnetic core 77 there is no danger that the secondary winding 86 or heater 87 will be injured on the flow of heavy fault current through the primary winding 74. By this means it is possible to provide a wider range in the time-current characteristics of the circuit interrupter 16 than is otherwise the case when reliance is placed solely on the flow of current through the single turn secondary winding 78 and bulb 63 for heating the latter to and above the critical operating temperature. Depending upon the design requirements, the heater 87 can be placed in close proximity to the bulb 63 or spaced away therefrom within the oil surrounding the same. In some instances, the single turn secondary winding 78 may be omitted altogether and reliance placed solely upon the heater 87 for heating the bulb 63.

As indicated hereinbefore, the flow of fault current through the circuit interrupter 16 may be such that the same would be injured or destroyed in the event that it should attempt to interrupt the same. For example, a bird or a squirrel may cause a dead short circuit between the bar 14 and the tank 9 so that a fault current of the order of several hundred or even thousands of amperes may flow. Under such conditions, it is desirable that the circuit be interrupted by the main circuit breaker, which is provided with ample interrupting capacity, rather than by the circuit interrupter 16. For this purpose, it is necessary to provide means for preventing the separation of the contact 29 from the contact 26 even though the hydraulic relay 59 functions to trip the latch mechanism.

For this purpose a third secondary winding 89 may be wound on the core 77 of the transformer 73. It may be arranged to energize the operating winding 90 of a holding mechanism, the details of construction of which are illustrated more clearly in Figures 3 and 4 of the drawings. The operating winding 90 is arranged to attract an armature 91 which is restrained by a spring 92. A yoke 93 is moved by the armature 91 and, when sufficient current flows through the operating winding 90, it is moved toward the contact 29 to the position shown in Figure 4, where it is located in the path of shoulder 94 that may be formed integrally with the contact 29.

Now, when fault current above a predetermined magnitude, for example, about 50 amperes, flows through the primary winding 74, sufficient current is induced in the secondary winding 89 to energize the operating winding 90 and to overcome the force of the spring 92 to move the yoke 93 into the path of the shoulder 94. Shortly thereafter, the bulb 63 is heated, as described hereinbefore, above its critical temperature and the hydraulic relay 59 functions to trip the latch mechanism. However, although the foot 49 is released from the latch lever 51, the contact 29 cannot move upwardly since it is restrained by the yoke 93 engaging the shoulder 94. As soon as the main circuit breaker operates to interrupt the circuit, the current flow through the primary winding 74 ceases. The current flow through the secondary winding 89, likewise, ceases and operating winding 90 is deenergized. The spring 92 then operates the yoke 93 out of the path of the shoulder 94 and permits spring 37 to move the contact 29 out of engagement with the contact 26. Since the circuit is deenergized, no arc is drawn between the contacts 26 and 29.

The main circuit breaker now can reclose to energize whatever other transformers may be connected thereto since the fault individual to the particular transformer where the circuit interrupter 16 has operated will isolate the same from the rest of the system.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

I claim as my invention:

1. Means for interrupting the circuit interconnecting a load device and a conductor energized with alternating current comprising, in combination, separable contacts adapted to be connected in said circuit, spring means for effecting separation of said contacts, latch means adapted normally to maintain said contacts closed against the separating force of said spring means; a transformer having a primary winding connected in series with said contacts in said circuit, two secondary windings, and a saturable core whereby the current flow in said secondary windings is limited; hydraulic relay means connected in circuit with one of said secondary windings and operatively connected to said latch means, and a heater connected in circuit with the other of said secondary windings adapted to heat a body of liquid surrounding said relay means for energizing said hydraulic relay means, said hydraulic relay means being responsive directly to the current flow in said one secondary winding and indirectly to the current flow in said other secondary winding for tripping said latch means.

2. Means for interrupting the circuit interconnecting a load device and a conductor energized with alternating current comprising, in combination, separable contacts adapted to be connected in said circuit, spring means for effecting separation of said contacts, latch means adapted normally to maintain said contacts closed against the separating force of said spring means; a transformer having a primary winding connected in series in said circuit, first, second, and third secondary windings on said transformer, and a saturable core whereby the current flow in said secondary windings is limited; hydraulic relay means connected in circuit with said first secondary winding and operatively connected to said latch means, a heater connected in circuit with said second secondary winding and arranged to energize said hydraulic relay means through a body of liquid surrounding both said heater and relay means, said hydraulic relay means being responsive directly to the current flow in said first secondary winding and indirectly to the current flow in said second secondary winding for tripping said latch means on flow of predetermined current in said circuit for a predetermined time, and holding means connected in circuit with said third secondary winding and operatively responsive to said current flow in excess of a predetermined minimum for preventing opening of said contacts as long as said excess current flows.

3. Circuit interrupting means according to claim 2 wherein the latch means for effecting separation of said contacts includes a tripping mechanism conductively connected to one of the contacts, and wherein there is a multi-part connecting member secured at one end to the other of said contacts and restrained at the other end by said tripping mechanism, and one of the parts of said connecting member being formed of resilient flexible material whereby said connecting member is manually releasable from said tripping mechanism without operating the same to permit separation of said contacts.

4. Circuit interrupting means according to claim 2 wherein the latch means for effecting separation of said contacts includes a tripping mechanism conductively connected to one of the contacts, and wherein there is a multi-part connecting member secured at one end to the other of said contacts and restrained at the other end by said tripping mechanism, one of the parts of said connecting member being formed of resilient flexible material whereby said connecting member is manually releasable from said tripping mechanism without operating the same to permit separation of said contacts, and the resilient part of the connecting member being a conductor connected to one of said contacts which is movable and having an extension which forms one terminal of a spark gap, the other spark gap terminal being formed by a conductor secured to another part of said connecting member which is of insulating material and arranged to be held by the tripping mechanism.

5. A thermally responsive circuit interrupting attachment for opening the circuit to the windings of a load device to be protected and which is connected in circuit with a source of electrical potential, comprising, a hollow pot member adapted to hold a body of insulating liquid and having an inner liner of conductor material, a lower connector terminal insulated from said pot and in electrical contact with said liner for connecting said attachment in circuit with said load device, a stationary contact in the bottom interior of said pot and insulated from said liner, a second movable contact above said stationary contact comprising a rod member of conductor material adapted to move vertically toward and away from said stationary contact, an insulating cap journalling the upper portion of said rod and covering over the top of said pot, thimble means within said insulator and surrounding said contact rod, compressive spring means surrounding the upper end of said rod and having its lower end bearing against said thimble means, the upper end of said spring means being secured to the upper end of said rod; a second connective terminal means comprising the upper end of said rod for connecting said apparatus in circuit with an electrical supply line conductor, a multi-part connector secured at one end to said second terminal and contact rod comprising a flexible strap of conductor material and an additional strap of non-conductor material; a tripping latch mechanism outside of said pot and adjacent one side thereof, the lower end of said non-conductive part of said connector being adapted for latching engagement with said tripping mechanism whereby said spring means resiliently may be compressed to hold said contacts together; a control transformer within said pot having secondary winding and a primary winding which is connected in series with said two contacts through said liner, and a thermally responsive relay means submerged in said fluid within said pot, said relay comprising a conductive bulb inductively connected across said secondary winding, partially filled with liquid and having a body of gas at the upper end therewithin, and a tubular member connecting the bottom of said bulb with an expansible bellows mounted externally of said pot and operatively associated with said tripping mechanism whereby upon the excitation of said secondary winding in response to a predetermined current flow in said primary winding of said control transformer, said gas will rapidly expand forcing said liquid within said bulb to flow into said bellows via said tubular member thereby to expand said bellows, trip said tripping mechanism to release said connector and cause said two contacts to separate thereby to interrupt the circuit to said load device windings.

CHARLES L. STROUP.

REFERENCES CITED

The following references are of record in the file of this patent:

UNITED STATES PATENTS

| Number | Name | Date |
|---|---|---|
| 488,123 | Keating | Dec. 13, 1892 |
| 656,680 | Thomson | Aug. 28, 1900 |
| 1,281,482 | Baruch | Oct. 15, 1918 |
| 1,443,583 | McGahan | Jan. 30, 1923 |
| 1,547,632 | Wensley | July 28, 1925 |
| 1,612,246 | Wittingham | Dec. 28, 1926 |
| 1,696,289 | Wood | Dec. 25, 1928 |
| 1,774,933 | Laubet | Sept. 2, 1930 |
| 1,856,586 | Persons | May 3, 1932 |
| 1,877,990 | Schweitzer | Sept. 20, 1932 |
| 2,053,944 | Cooney | Sept. 8, 1936 |
| 2,117,583 | Van Antwerp | May 17, 1938 |
| 2,311,699 | Schwager | Feb. 23, 1943 |
| 2,369,986 | Schaefer | Feb. 20, 1945 |
| 2,372,140 | Van Sickle | Mar. 20, 1945 |
| 2,403,372 | Jackson | July 2, 1946 |
| 2,457,939 | Stroup | Jan. 4, 1949 |

FOREIGN PATENTS

| Number | Country | Date |
|---|---|---|
| 309,895 | Germany | Nov. 17, 1917 |